United States Patent [19]

Tsuchiya et al.

[11] 4,426,162
[45] Jan. 17, 1984

[54] ROTOR SHAFT

[75] Inventors: Keiichi Tsuchiya, Tokyo; Katsukuni Hisano, Hitachi; Toshimi Tan, Hitachi; Masahiro Kobayashi, Hitachi; Kei Kobayashi, Kitaibaraki; Kazuhiko Ueda, Hitachi; Seishin Kirihara, Hitachi; Takatoshi Yoshioka, Hitachi; Masao Shiga, Hitachi, all of Japan

[73] Assignee: Hitachi, Ltd., Tokyo, Japan

[21] Appl. No.: 326,351

[22] Filed: Dec. 1, 1981

[30] Foreign Application Priority Data

Dec. 2, 1980 [JP] Japan ................................. 55-170595
Dec. 2, 1980 [JP] Japan ................................. 55-170597

[51] Int. Cl.³ .......................... F16C 33/12; F16C 33/14
[52] U.S. Cl. ...................................... 384/280; 384/295
[58] Field of Search ............... 384/280, 296, 295, 281, 384/301, 288; 138/158, 157

[56] References Cited

U.S. PATENT DOCUMENTS

| 121,318 | 11/1871 | Bender | 138/158 |
|---|---|---|---|
| 2,704,234 | 3/1955 | Love et al. | 384/280 |
| 2,913,290 | 11/1959 | Jackman | 384/281 |
| 3,022,126 | 2/1962 | Siebert | 384/296 |

Primary Examiner—Lenard A. Footland
Attorney, Agent, or Firm—Antonelli, Terry & Wands

[57] ABSTRACT

A rotor shaft suitable for use as the rotor shaft of a steam turbine. The rotor shaft has a rotor shaft portion made of a Cr alloy steel having martensite structure and containing 8 to 13% Cr. The rotor shaft body is provided with at least one journal portion at which the rotor shaft is rotatably supported by a bearing. The rotor shaft further has a sleeve fitted around each journal portion. The sleeve is divided in the circumferential direction into a plurality of segments which are assembled together by welding or fitting into the sleeve having a circular cross-section. Due to the provision of the sleeve around the journal portion, the rotor shaft made of Cr alloy steel can have improved bearing properties.

8 Claims, 10 Drawing Figures

ROTOR SHAFT

BACKGROUND OF THE INVENTION

The present invention relates to a rotor shaft and, more particularly, to a rotor shaft made of a steel containing 8 to 13% of Cr suitable for use as a rotor shaft of steam turbine.

In recent years, 12% Cr alloy steel is finding a spreading use as the material of rotor shafts of steam turbines, because of its high mechanical strength and toughness at high temperature range. The 12% Cr alloy steel, however, has inferior bearing properties, particularly wear resistance property. Consequently, various accidents are often experienced such as seizure of the bearing metal in support of the rotor journal, damaging of the rotor journals and bearings and so forth, due to jamming of foreign matter such as dust in the bearing.

To obviate this problem, Japanese Patent Laid-open Publication No. 16744/80 discloses a rotor shaft made of a 12% Cr alloy steel, with journal portions covered by a layer of a metal having good bearing properties formed by a metallizing, as well as a rotor shaft made of a 12% Cr alloy steel, with built up or raised journal portions formed by welding with a welding rod of a metal having good bearing properties.

The rotor shaft having the journal portions covered with the metal layer formed by metallizing, however, exhibits only a small affinity or bonding force between the metal layer and the base metal of the rotor. In addition, the metal layer formed by the metallizing tends to involve oxides and voids which seriously lower the tensile strength and toughness of the metal layer. Consequently, the metal layer formed by the metallizing is liable to be separated from the journal portion when a bending force is applied to the rotor shaft.

The rotor shaft having raised welded journal portions involves the problem that, in order to prevent the cracking in the built-up welded layer, it is necessary to strictly select the kind of welding metal used with respect to the welding condition relative to the base metal. This sometimes imposes a difficulty in the selection of the welding metal having good bearing properties. In other words, in some cases, the padding or build up metal is selected to meet the welding condition, at the cost of a poor bearing characteristics.

In general, in the rotor shaft assembly in which a coupling is fitted by shrink fit to a steam turbine rotor shaft for connection to the rotor shaft of a generator, there is a fear of cracking in the rotor at the portion thereof where the coupling is attached by a shrink fit.

Under these circumstances, there has been an increasing demand for a turbine rotor shaft having a coupling integral therewith and exhibiting a high reliability and good bearing properties.

SUMMARY OF THE INVENTION

Accordingly, an object of the invention is to provide a rotor shaft having superior bearing properties, made of a Cr alloy steel having a high Cr content.

Another object of the invention is to provide a rotor shaft made of a Cr alloy steel, provided with a sleeve having superior bearing properties, the sleeve being attachable to a journal portion of the rotor shaft even when the rotor shaft has a coupling integral therewith.

Still another object of the invention is to provide a rotor shaft made of a Cr alloy steel having mainly martensite structure, wherein a cylindrical sleeve is fitted around each journal portion of the rotor shaft, the sleeve being made of a low alloy steel having superior bearing properties and divided in the circumferential direction into a plurality of segments which are assembled together into one body.

DESCRIPTION OF THE PREFERRED EMBODIMENTS

The invention will be fully understood from the following description of the preferred embodiments with reference to the accompanying drawings.

Throughout the specification, the term "rotor made of 12% Cr steel" or "12% Cr steel rotor" is used to mean a steam turbine rotor made of a Cr alloy steel having martensite structure and containing 8–13% Cr.

Figure 1:
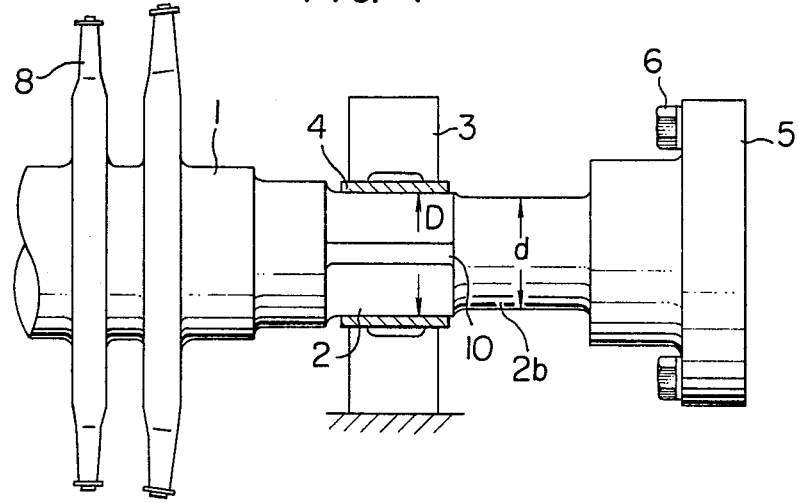
FIG. 1 is a sectional view of a turbine rotor shaft in accordance with an embodiment of the invention, made of a 12% Cr alloy steel and provided with a sleeve fitting around a journal portion of the rotor shaft.
Figure 2:
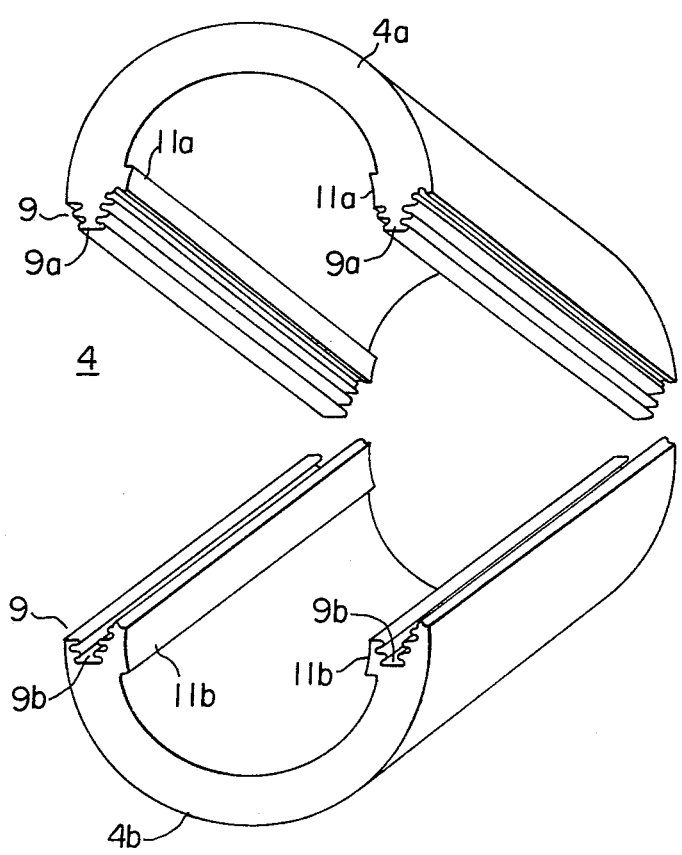
FIG. 2 is an exploded perspective view showing the detail of the sleeve as shown in FIG. 1 made of a low alloy steel.

Referring first to FIG. 1, a rotor 1, made of 12% Cr steel, has a plurality of stages of moving blades disposed in the axial direction of the rotor, each stage including a large number of radially arranged moving blades 8. The rotor 1 is adapted to be connected to a rotor (not shown) of a generator through a coupling 5 integrally formed on one end of the rotor 1. Coupling bolts 6 are attached to the coupling 5. The rotor 1 is adapted to be rotatably supported by bearings, with the portion of the rotor 1 facing each bearing 3 constituting a journal portion 2 around which fitted is a cylindrical sleeve 4 which is divided in circumferential direction into two segments 4a, 4b, (FIG. 2). A portion 2b of the rotor 1 between the journal portion 2 and the coupling 5 has a diameter d which is several millimeters smaller than an outside diameter D of the journal portion 2. The assembling and/or welding of two segments 4a, 4b of the sleeve 4 is carried out on the rotor portion 2b of reduced diameter to facilitate the formation of the cylindrical sleeve 4. The cylindrical sleeve 4 thus formed is then fitted around the journal portion 2 of the rotor.

As shown in FIG. 2, the two circumferential segments 4a, 4b of the sleeve 4 are provided at their joint surfaces with mating projection 9a, and recess 9b which, in combination, constitute fitting portions 9. Each projection 9a and recess 9b have dove-tail configurations in order to hold two segments in one body withstanding the centrifugal force acting on the sleeve 4 during the rotation of the rotor 1.

Figure 3:
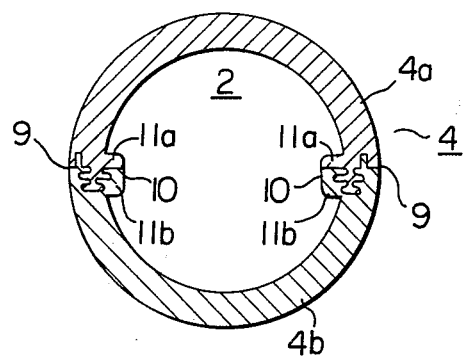
FIG. 3 is a sectional view of the sleeve shown in FIG. 2 in the state fitting around the journal portion of the rotor shaft.

Further, in order to reduce the level of the stress to which each fitting portion 9 should withstand it is possible to adopt a construction as shown in FIGS. 1 and 3. Namely, in this case, axial guide grooves 10 are formed in the diametrically opposing portions of the peripheral surface of the journal portion 2. On the other hand, the side surfaces of the projections 9a and the side surfaces of the wall defining the recesses 9b, constituting the diametrically opposing portions of the inner peripheral surface of the sleeve 4, are protruded inwardly as at 11a, 11b. These protrusions 11a, 11b of the sleeve segments 4a, 4b are adapted to be fitted into the aforementioned grooves 10 in the rotor surface, so that a part of the load applied to the sleeve 4 by the centrifugal force is shared by the fitting of the protrusions 11a, 11b into the groove 10 as shown in FIG. 3.

The sleeve 4 is mounted on the journal portion 2 of the rotor in accordance with the following procedure. That is, after securing the sleeve 4 around the journal portion 2, the fitting portion 9 is caulked by rolls, etc. pressed against an outer peripheral surface of the sleeve to eliminate any play in the fitting portion 9. Then, the outer peripheral surface of the sleeve 4 is mechanically processed into circular form.

Incidentally, in the rotor shaft having the above-mentioned construction, it is conceivable that stress is concentrated to the portions of the sleeve 4 around the grooves 10. These grooves, however, are equivalent to the key grooves conventionally provided in the rotor shafts. In addition, the stress acting onto the sleeve 2 is not so large. For these reasons, the concentration of the stress does not cause any substantial problem.

As stated before, the sleeve 4 is made of a metal having superior bearing properties. This metal is preferably a low alloy steel such as a bainite steel consisting essentially of 0.2 to 2.25% Cr, 0.2 to 1% Mo, and the balance Fe. More preferably, the material of the sleeve 4 is a bainite steel which contains, in addition to the constituents mentioned above, 0.05 to 0.5% V.

The reason why a low alloy steel is preferably used as the material of the sleeve 4 is as follows. Namely, the low alloy steel has a heat conductivity which is about 30% higher than that of the 12% Cr steel used as the material of the rotor 1, so that the sleeve 4 exhibits a small temperature rise during the rotation of the rotor 1. Consequently, the tendency of seizure between the sleeve 4 and the bearing 3 due to the temperature rise caused by friction is advantageously suppressed.

This advantage has been confirmed also through an experiment. The experiment was conducted using a rotor 1 made of the 12% Cr steel and a rotor of the same material as the sleeve 4, i.e. a low alloy steel containing Cr, Mo and V. These rotors were rotatably supported at their journal portions 2 by bearings and rotated at a predetermined speed, while supplying a lubrication oil to the bearings. Fine particles of foreign matter were added to the lubrication oil, and the extent of damage of the journal portions 2 due to the presence of the foreign matter was examined.

Figure 4:
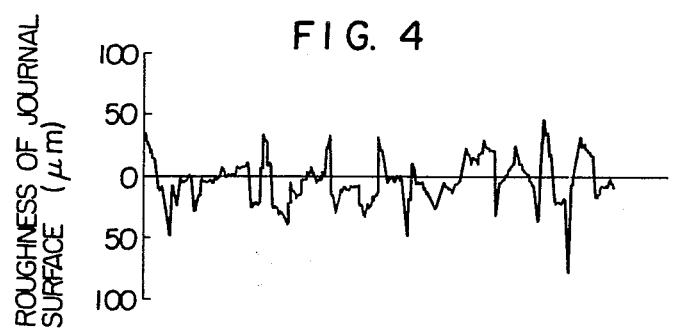
FIGS. 4 and 5 are graphical representations of the results of experiments conducted to measure the surface roughness of the rotor shaft journal made of 12% Cr alloy steel and the rotor shaft journal made of a low alloy steel.
Figure 5:
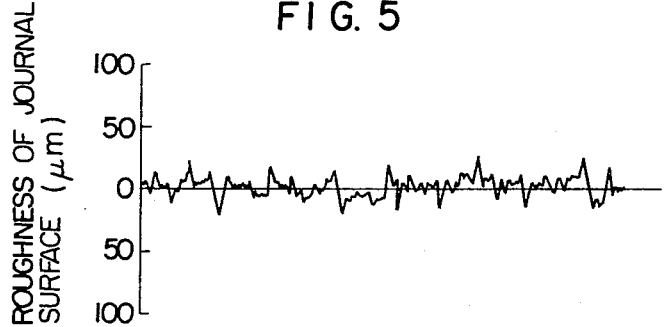

FIGS. 4 and 5 show the roughnesses of the journal surfaces of the rotors made of the 12% Cr steel and the low alloy steel containing Cr, Mo and V, respectively, as observed after lapse of a predetermined time from the commencement of addition of foreign matter particles to the lubrication oil. From these Figures, it will be seen that the low alloy steel exhibits superior wear resistance to the 12% Cr steel.

According to the invention, the 12% Cr steel used as the material of the rotor shaft is preferably a forged steel having all martensite structure and consisting essentially of 0.1 to 0.3% Co, less than 0.6% Si, 0.4 to 1.5% Mn, less than 1.2% Ni, 10 to 14% Cr, 0.5 to 1.5% Mo, 0.05 to 0.3% V, 0.02 to 0.15% Nb, 0.04 to 0.1% of N, and the balance Fe.

Figure 6:
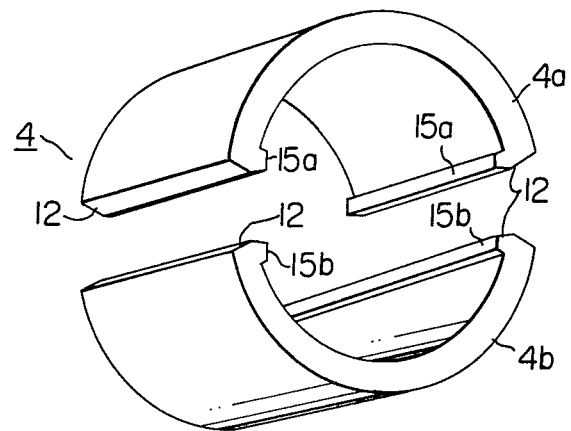
FIG. 6 is a perspective view of a sleeve for use in a rotor shaft constructed in accordance with another embodiment of the invention.

As shown in FIG. 6, as in the case of the preceding embodiment, a cylindrical sleeve 4, made of a low alloy steel is divided in the circumferential direction into segments 4a, 4b. The number of segments, however, is not limited to two and it is possible to divide the sleeve into two or more segments. Each abutting surface 12 constituting the joint surface between adjacent sleeves 4a, 4b is provided with a bevel for welding. Also, a projection 15a or 15b is formed on the joint surface 12 to project radially inwardly therefrom.

The sleeve segments 4a, 4b have been precisely processed taking into account the tolerance for shrinkage fit. These segments 4a, 4b are assembled together on the reduced-diameter portion 2b of the rotor and joined to each other by welding. The sleeve 4 thus formed is then fitted around the journal portion. Consequently, the sleeve 4 is fitted around the journal at a tightness equivalent to that achieved by a shrink fit. The welding conducted on the joint surfaces 12 of the sleeve segments 4a, 4b may be conducted by arc welding, electron beam welding or any other known welding technic. Preferably, the sleeve 4 is subjected, after the welding, to an SR treatment for reducing the residual stress in the weld zone and for improving the toughness.

In order to avoid undesirable oxidation of the inner surface of the sleeve and the surface of the journal portion of the rotor, the SR treatment is preferably conducted in vacuum or in a non-oxidizing atmosphere. After the SR treatment of the sleeve 4, the surface is finished and then the sleeve 4 is fitted by a shrink fit. The SR treatment is preferably conducted at 650° to 700° C. and for 0.5 to 5 hours.

An explanation will be made hereinunder as to a practical example of the procedure which was carried out for mounting the sleeve 4 on the journal portion 2 of the rotor. The sleeve segments 4a, 4b themselves have constructions as shown in FIG. 6. These segments 4a, 4b were brought together on the reduced-diameter portion 2b of the rotor, and welding was conducted on the bevels of the joint surfaces 12 between the sleeve segments 4a, 4b to unite these sleeve segments 4a, 4b. More specifically, the welding was carried out by preheating the joint surfaces 12 up to 250° to 300° C. and maintaining the same temperature between successive passes. The first pass was made by TIG welding to obtain a sufficient penetration to the back side of the bevel. The subsequent passes were made by means of a covered arc welding rod for low alloy steel. After forming the cylindrical sleeve 4 by the welding of the sleeve segments 4a, 4b, the sleeve 4 was held at a predetermined temperature and fitted around the journal portion 2 of the rotor. More specifically, the sleeve 4, the temperature of which is 250° to 300° C. after the welding, was directly fitted around the journal portion. Then, an ultrasonic flaw detection and a magnetic flaw detection were conducted to check the weld part for any flaw or defect in the weld part, but no flaw nor defect was found. Then, the outer surface of the sleeve was mirror-finished and the sleeve 4 was subjected to a running test in combination with a bearing made of Babbitt metal. No seizure of the journal was observed and superior bearing characteristics were confirmed.

Figure 7:
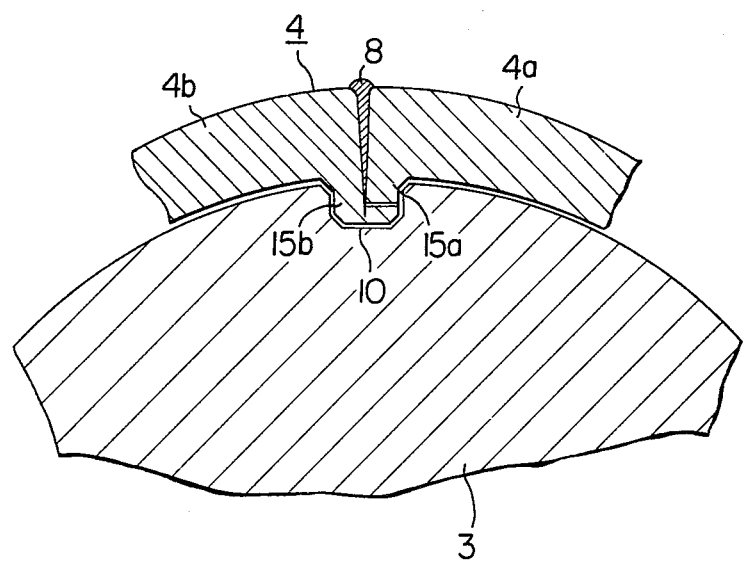
FIG. 7 is a fragmentary sectional view of a rotor shaft provided with the sleeve as shown in FIG. 6.

Referring now to FIG. 7 which is a sectional view of the journal portion 2 of a rotor 1 having the welded sleeve 4 fitted around the journal portion, the projections 15a, 15b on the back side of the bevels of joint surfaces 12 of the sleeve segments 4a, 4b are adapted to be received by grooves 10 formed in the journal surface as in the case of embodiment shown in FIG. 1. After fitting the projections 15a, 15b of the sleeve segments 4a, 4b in the grooves 10 of the rotor, the sleeve segments 4a, 4b are welded to each other by means of a beam of a high energy density. Namely, the weld 8 shown in FIG. 7 is formed by an electron beam welding. According to this method, it is possible to concentrate any defect in the weld beam to the portion around the projections 15a, 15b to where no circumferential stress is applied, so that the sleeve 4 thus formed can be used as it is, without necessitating troublesome work for eliminating any weld defect which tends to appear in the weld part of the sleeve due to insufficient penetration. The projections 15a, 15b are effective also in preventing the weld bead from reaching the rotor surface.

Figure 8:
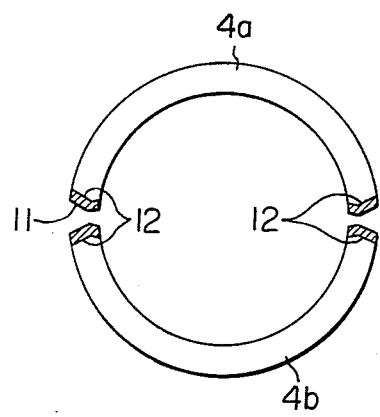
FIGS. 8 and 9 are sectional views of a sleeve for use in a rotor shaft constructed in accordance with still another embodiment of the invention.
Figure 9:
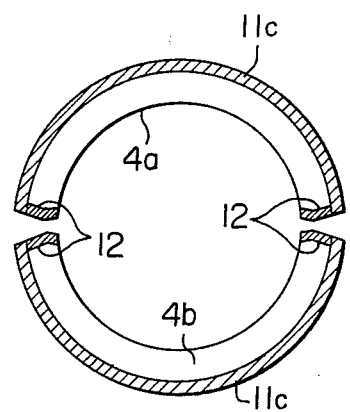

FIGS. 8 and 9 show different embodiments in which the abutting surfaces constituting the bevels of the sleeve segments 4a, 4b, as well as the entire surfaces of the sleeve segments 4a, 4b, are beforehand coated with metal layers 11c formed by build-up welding. More specifically, in the embodiment shown in FIG. 8, the build-up welding is effected only on the joint surfaces 12 to form the layer 11a. By so doing, it is possible to omit the SR treatment which has to be made after the welding of the sleeve segments. In the embodiment shown in FIG. 9, the entire surfaces of the sleeve segments 4a, 4b including the joint surfaces 12 are covered by the metal layer 11b formed by build-up welding. In this case, the whole part of the outer surface of the sleeve 4 is formed of the metal layer formed by build-up welding, so that it is possible to obtain uniform wear properties over the whole surface of the sleeve 4. Needless to say, it is preferred to subject the sleeve segments 4a, 4b to an SR treatment subsequently to the build-up welding. The material used for the build-up welding preferably has a chemical composition same as that of the material of the sleeve. It is also preferred to impart a peening, after the welding for jointing two sleeve segments 4a, 4b, to the weld part to reduce the level of the residual stress in the weld zone.

Figure 10:
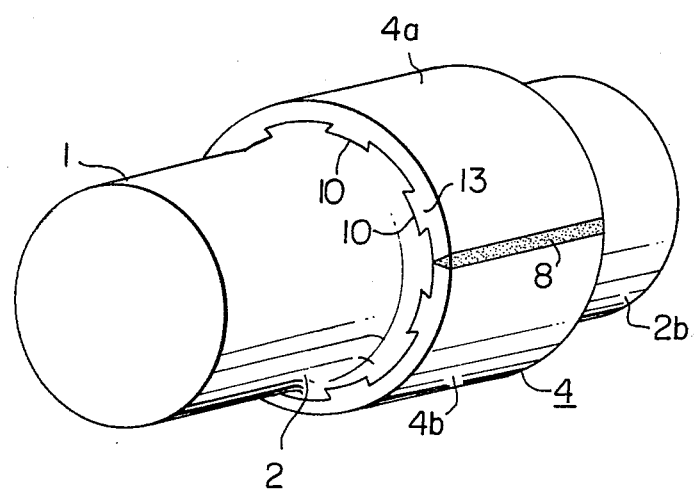
FIG. 10 is a perspective view of a further embodiment of the invention, provided with a different form of the sleeve.

FIG. 10 shows a different embodiment in which a plurality of longitudinal guide grooves 10 are formed in the surface of the journal portion 2 at a predetermined pitch in the circumferential direction. On the other hand, the sleeve 4 in the assembled state has a plurality of inward protrusions 13 adapted to be received by corresponding grooves 10. If a slight gap is formed in the fitting portion between the groove 10 and the associated protrusion 13 of the sleeve 4, the lubrication oil may come into the gap to corrode the journal during the operation of the rotor 1. In order to avoid such a corrosion, the outer peripheral surface of the sleeve 4 is caulked by the rolls after fitting of the sleeve 4 around the journal portion 2 and, then, the outer peripheral surface of the sleeve 4 is mechanically processed into a circular form.

For uniting the sleeve segments 4a, 4b to form the sleeve 4, these segments are brought into abutment with each other at the joint surfaces and welding is effected on these joint surfaces thereby to integrate these segments through the weld zones 8.

As has been described, according to the invention, it is possible to obtain a rotor shaft having journal portions each of which is covered by a sleeve of a metallic material having superior bearing properties. This in turn permits advantageously the production of a steam turbine rotor of a high Cr steel having mainly martensite structure, provided with a coupling integral therewith.

What is claimed is:

1. A rotor shaft comprising: a rotor shaft body provided with at least one journal portion adapted to be rotatably supported by a bearing, the rotor shaft body being made of a Cr alloy steel having mainly martensite structure; and a cylindrical sleeve fitting around said at least one journal portion, said sleeve being made of a low alloy steel and being divided in a circumferential direction into a plurality of segments which are adapted to be joined together to closely fit around said at least one journal portion, said segments are provided with protrusions on inner surfaces thereof, said protrusions extending along joint surfaces of said segments, said at least one journal portion of said rotor shaft is provided on a peripheral surface thereof with grooves for receiving said protrusions.

2. A rotor shaft as claimed in claim 1, wherein joint surfaces of said segments are provided with mating projections and recesses so as to enable said segments to be united into one body by fitting said projections in said recesses.

3. A rotor shaft as claimed in claim 1, wherein said protrusions extend in an axial direction of said sleeve, said grooves on the inner peripheral surface of said at least one journal portion of said rotor shaft extend in an axial direction of said journal portion and are adapted to closely receive said protrusions, whereby said sleeve is secured to said journal portion through engagement between said protrusions and said grooves.

4. A rotor shaft as claimed in claim 1, wherein said segments are united into one body by welding effected on joint surfaces of segments.

5. A rotor shaft as claimed in claim 1, wherein said rotor shaft body has a coupling integral therewith.

6. A rotor shaft comprising a rotor shaft body provided with at least one journal portion adapted to be rotatably supported by a bearing, the rotor shaft body being made of a Cr alloy steel having mainly martensite structure; and a cylindrical sleeve fitted around said at least one journal portion, said sleeve being made of a low alloy steel and being divided in a circumferential direction into a plurality of segments which are adapted to be joined together to closely fit around said at least one journal portion, said low alloy steel of said sleeve is a bainite steel consisting essentially of, by weight, 0.2 to 2.25% Cr, 0.2 to 1% Mo, and the balance Fe.

7. A rotor shaft comprising a rotor shaft body provided with at least one journal portion adapted to be rotatably supported by a bearing, the rotor shaft body being made of a Cr alloy steel having mainly martensite structure; and a cylindrical sleeve fitted around said at least one journal portion, said sleeve being made of a low alloy steel and being divided in a circumferential direction int a plurality of segments which are adapted to be joined together to closely fit around said at least one journal portion, said low alloy steel of said sleeve is a bainite steel consisting essentially of, by weight, 0.2 to 2.25% Cr, 0.2 to 1% Mo, 0.05 to 0.5% V, and the balance Fe.

8. A rotor shaft comprising: a rotor shaft body provided with at least one journal portion adapted to be rotatably supported by a bearing, the rotor shaft body being made of a Cr alloy steel, said Cr alloy steel of said rotor shaft body is an alloy steel having all martensite structure and consisting essentially of, by weight, 0.1 to 0.3% Co, less than 0.6% Si, 0.4 to 1.5% Mn, less than 1.2% Ni, 8 to 13% Cr, 0.5 to 1.5% Mo, 0.05 to 0.3% V, 0.02 to 0.15% Nb, 0.04 to 0.1% N, and the balance Fe; and a cylindrical sleeve fitted around said at least one journal portion, said sleeve being made of a low alloy steel and being divided in a circumferential direction into a plurality of segments which are adapted to be joined together to closely fit around said at least one journal portion.

* * * * *